J. B. REDFIELD.
TALLY SHEET.
APPLICATION FILED JULY 3, 1914.

1,301,742.

Patented Apr. 22, 1919.

Witnesses:

Inventor,
J. B. Redfield.
By David O. Barnell,
Attorney.

UNITED STATES PATENT OFFICE.

JOSIAH B. REDFIELD, OF OMAHA, NEBRASKA.

TALLY-SHEET.

1,301,742.

Specification of Letters Patent.

Patented Apr. 22, 1919.

Application filed July 3, 1914. Serial No. 848,972.

*To all whom it may concern:*

Be it known that I, JOSIAH B. REDFIELD, a citizen of the United States, and a resident of Omaha, in the county of Douglas and State of Nebraska, have invented certain new and useful Improvements in Tally-Sheets, of which the following is a specification.

My invention relates especially to tally-sheets for use by election officials in counting the votes cast for various candidates for office. It is the object of my invention to provide for the above purpose a tally-sheet having spaces for receiving tally-marks, the spaces being arranged so as to minimize the possibility of errors either in the making or counting of the tally-marks, and having also means for preventing fraudulent alteration of the record after the tallying and counting of the votes has been completed.

In the accompanying drawing there is illustrated a portion of a tally-sheet embodying my invention, repetitional portions of the sheet being broken away.

In carrying out my invention the paper employed for making the tally-sheet is preferably a "safety" paper such as is used for bank-checks and the like, the same being coated or glazed or impregnated with chemical substances, or printed over in neutral tints with an engraved design, so as to retain evidences of any erasures or alterations of inscriptions which have once been made thereon.

In the arrangement shown in the drawing there is provided along the upper edge of the sheet a suitable space 1 bounded by a horizontal line or lines 2 at the bottom thereof, said space being employed for the printing of a suitable heading or title, or for instructions as to the use of the sheet, or for such other purposes as may be desired. Below the line 2 is a second line or lines 3, and at intervals between the lines 2 and 3 are vertical lines which define the limits of spaces for the column-designations "Name of office", "Names of persons voted for", and "Total". At the left of the sheet, under the column-designation "Name of office", there is a vertical space 4 bounded at the right by a vertical line or lines 5. All of the sheet below the line 3 and to the right of the line 5 is traversed by parallel horizontal lines which divide the sheet into horizontal vertically-alternating portions 6 and 7. The portions 7 are left blank throughout and the vertical depth of the said portions is preferably not less than the corresponding depth of the portions 6, so that the blank spaces 7 will clearly separate and differentiate from each other the several portions 6. At the left ends of each of the portions 6 are placed line-denominators, the same preferably consisting of characters of some conventionally-arranged series, such as the alphabetical letters "A", "B", "C", shown in the drawing. At the right of said line-denominator characters, under the column-designation "Names of persons voted for", are name-spaces 8 in which are written the names of persons for whom votes have been cast for the office of which the name is written in the column 4. To the right of the name-spaces are the tally-spaces 9 which comprise horizontal rows of rectangular areas having shaded portions arranged alternately at the tops and bottoms thereof, and having in the shaded portions the numerals "5", "10", . . . "325", "330", indicating respectively the total number of tally-marks that may be inscribed in the tally-spaces from the left-hand end of the row up to and including space in which the numeral is placed. At the right of the tally-spaces the line-denominator characters "A", "B", etc. are repeated, and at the extreme right of the sheet, under the column-designation "Total", are spaces 10 for writing in the total number of votes cast for each of the several candidates.

In the use of the tally-sheet the same is first prepared by placing thereon, in the spaces provided for such purpose, the names of the persons for whom votes have been cast, and the name of the office for which said persons are candidates. As the ballots are inspected and the names of the persons voted for are called out by the inspectors, the tally-man, or person in charge of the tally-sheet, inscribes the tally-marks on the sheet in the appropriate spaces following the respective names. The ordinary system of tally-marks is employed, the same consisting of groups of four approximately vertical lines joined by a fifth line extending diagonally. One of the tally-spaces 9 is used for each group of tally-marks, the marking being commenced, of course, in the first or left-hand space, and the marks being placed in the blank or unshaded parts of the spaces, as represented in the drawing. When the tallying is completed the total number of marks following each name is written by numerals in the next succeeding unused tally-space, and a circular line 11 is drawn around said numerals, as shown. The total number of tally-marks following each name is also written out in full, as shown, in the space 10 under the column-designation "Total".

The advantages of the tally-sheet provided by my invention will be obvious. When used as described it will be exceedingly difficult if not impossible to alter the marking of the sheet after the same has been completed, without the same bearing evidence of such alteration. Owing to the complete separation of the rows of tally-spaces by the dividing-spaces 7, there is little chance of confusion in entering the tally-marks, the probability of such marks being inscribed in a row other than that intended being reduced to a minimum. The facility with which a row of the tally-spaces may be followed is further increased by the use of the line-demoninator characters at each end of the respective lines or rows of tally-spaces. The tally-man, when noting the name at the left of the row, may at the same time observe the line-denominator character and, if the tally-spaces have been filled to a point near the right-hand side of the sheet, the following of the line or row may be verified by observing that the right-hand line-denominator is the same as that of the line intended to be followed.

The correct inscription of the tally-marks is also facilitated by the alternating arrangement of the shaded areas of the tally-spaces. Such shaded areas practically compel the making of the tally-marks in the blank or unshaded portions of the spaces, so that each succeeding area on which the marks are inscribed is vertically offset or displaced from those adjoining it. This tends to prevent the possibility of a tally-mark being inscribed so as to extend into an adjoining tally-space and thus being confused with or mistaken for a mark properly belonging in such space. The numerals placed in the shaded areas of the tally-spaces facilitate accurate counting of the tally-marks, by showing directly the total number of marks in any line or row when the spaces have been filled up to any vertical division-line of the row.

Now, having described my invention, what I claim and desire to secure by Letters Patent is:

1. A tally-sheet having printed thereon lines forming horizontal single rows of tally-spaces, each tally-space having a shaded portion, the successive tally-spaces in each row having the shaded portions thereof arranged alternately at the tops and bottoms of the spaces, and the successive shaded portions of each row numbered serially in arithmetical progression.

2. A tally-sheet having printed thereon lines forming horizontal single rows of rectangular tally-spaces and continuous blank dividing-spaces interposed between each of the adjacent rows of tally-spaces, each row of tally-spaces having therein a plurality of like line-denominator characters, the tally-spaces of each row having shaded portions arranged alternately at the tops and bottoms of the successive spaces, and the successive tally-spaces of each row numbered serially in arithmetical progression.

In testimony whereof I have hereunto subscribed my name in the presence of two witnesses.

JOE B. REDFIELD.

Witnesses:
   D. O. BARNELL,
   C. R. GOUCHER.